US010798027B2

(12) United States Patent
Agarwal et al.

(10) Patent No.: US 10,798,027 B2
(45) Date of Patent: Oct. 6, 2020

(54) PERSONALIZED COMMUNICATIONS USING SEMANTIC MEMORY

(71) Applicant: Microsoft Technology Licensing, LLC, Redmond, WA (US)

(72) Inventors: Vipul Agarwal, Bellevue, WA (US); Omar Zia Khan, Kirkland, WA (US); Imed Zitouni, Bellevue, WA (US); Hisami Suzuki, Redmond, WA (US)

( * ) Notice: Subject to any disclaimer, the term of this patent is extended or adjusted under 35 U.S.C. 154(b) by 174 days.

(21) Appl. No.: 15/450,004

(22) Filed: Mar. 5, 2017

(65) Prior Publication Data

US 2018/0255005 A1  Sep. 6, 2018

(51) Int. Cl.
| | |
|---|---|
| *H04L 12/58* | (2006.01) |
| *G06F 3/0481* | (2013.01) |
| *G06F 16/9535* | (2019.01) |
| *G06F 40/35* | (2020.01) |
| *G06F 40/56* | (2020.01) |
| *G06F 40/274* | (2020.01) |
| *G06F 40/295* | (2020.01) |
| *G06Q 30/02* | (2012.01) |

(52) U.S. Cl.
CPC ............ *H04L 51/02* (2013.01); *G06F 3/0481* (2013.01); *G06F 16/9535* (2019.01); *G06F 40/274* (2020.01); *G06F 40/295* (2020.01); *G06F 40/35* (2020.01); *G06F 40/56* (2020.01); *G06Q 30/02* (2013.01)

(58) Field of Classification Search
CPC .................... G06F 17/30867; G06F 17/276
See application file for complete search history.

(56) References Cited

U.S. PATENT DOCUMENTS

| | | |
|---|---|---|
| 6,829,603 B1 | 12/2004 | Chai et al. |
| 8,670,979 B2 | 3/2014 | Gruber et al. |
| 9,325,809 B1 | 4/2016 | Barros et al. |
| 2009/0306981 A1 | 12/2009 | Cromack et al. |
| 2013/0031476 A1 | 1/2013 | Coin et al. |
| 2014/0079297 A1 | 3/2014 | Tadayon et al. |
| 2015/0134326 A1* | 5/2015 | Bell ..................... G06F 17/276 704/9 |

(Continued)

OTHER PUBLICATIONS

Xu, et al., "Incorporating Loose-Structured Knowledge into LSTM with Recall Gate for Conversation Modeling", In Journal of Computing Research Repository, May 2016, 10 pages.

(Continued)

*Primary Examiner* — Aftab N. Khan
(74) *Attorney, Agent, or Firm* — Shook, Hardy & Bacon, LLP

(57) ABSTRACT

Systems and methods are disclosed for personalized communications using semantic memory. In one implementation, a first communication is received from a user and processed to identify a first content element within the communication. The first content element is associated with a second content element within a content repository. A second communication that includes the first content element is received from the user. Based on an association between the first content element and the second content element within the content repository, a third communication that includes the second content element is generated and provided to the user in response to the second communication.

17 Claims, 5 Drawing Sheets

(56) References Cited

U.S. PATENT DOCUMENTS

| | | | | |
|---|---|---|---|---|
| 2015/0142704 | A1* | 5/2015 | London | G06F 16/90332 706/11 |
| 2015/0269938 | A1* | 9/2015 | Lloyd | G10L 15/183 704/235 |
| 2016/0035353 | A1* | 2/2016 | Chen | G10L 17/22 704/235 |
| 2016/0140236 | A1 | 5/2016 | Estes | |

OTHER PUBLICATIONS

Roy, Suman Deb, "What Bots May Come", https://chatbotsmagazine.com/what-bots-may-come-a35b2bb9bd58, Published on: Mar. 20, 2016, 9 pages.

Robertson, et al., "The probabilistic relevance framework: BM25 and beyond", In Journal Foundations and Trends in Information Retrieval archive vol. 3, Issue 4, Apr. 2009, pp. 333-389.

"Learning to rank for information retrieval", In Journal Foundations and Trends in Information Retrieval archive, Mar. 2009, pp. 225-331.

Pfleger, et al., "Towards resolving referring expressions by implicitly activated referents in practical dialogue systems", In Proceedings of the 10th Workshop on the Semantics and Pragmatics of Dialogue, Sep. 11, 2006, 8 pages.

Janarthanam, et al., "Learning to adapt to unknown users: Referring expression generation in spoken dialogue systems", In Proceedings of the 48th Annual Meeting of the Association for Computational Linguistics, Jul. 11, 2010, pp. 69-78.

Garoufi, et al., "Combining symbolic and corpus-based approaches for the generation of successful referring expressions", In Proceedings of the 13th European Workshop on Natural Language Generation, Sep. 28, 2011, pp. 121-131.

Funakoshi, et al., "Modeling referring expressions with Bayesian networks", In Proceedings of the 16th Workshop on the Semantics & Pragmatics of Dialogue, Sep. 2012, pp. 153-156.

Zukerman, et al., "Employing distance-based semantics to interpret spoken referring expressions", In Journal Computer Speech and Language archive vol. 34, Issue 1, Nov. 2015, pp. 154-185.

Celikyilmaz, et al., "Resolving referring expressions in conversational dialogs for natural user interfaces", In Proceedings of the Conference on Empirical Methods in Natural Language Processing, Oct. 25, 2014, pp. 2094-2101.

Zwicklbauer, et al., "Robust and collective entity disambiguation through semantic embeddings", In Proceedings of the 39th International ACM SIGIR conference on Research and Development in Information Retrieval, Jul. 17, 2016, pp. 425-434.

Mazuel, et al., "Generic natural language command interpretation in ontology-based dialogue systems", In Proceedings of the IEEE/WIC/ACM international conference on Web Intelligence and Intelligent Agent Technology, Dec. 18, 2006, 4 pages.

Ma, et al., "Knowledge graph inference for spoken dialog systems", In Proceedings of 40th IEEE International Conference on Acoustics, Speech and Signal Processing, Apr. 15, 2015, 5 pages.

Chen, et al., "Jointly modeling inter-slot relations by random walk on knowledge graphs for unsupervised spoken language understanding", In Proceedings of the Conference of the North American Chapter of the Association for Computational Linguistics: Human Language Technologies, May 31, 2015, 11 pages.

Li, et al., "Personal knowledge graph population from user utterances in conversational understanding", In Proceedings of IEEE Spoken Language Technology Workshop, Dec. 7, 2014, pp. 224-229.

Sabouret, et al., "Automated answers to questions about a running process", In Proceedings of CommonSense, Dec. 2001, pp. 1-11.

Cimiano, et al., "Towards portable natural language interfaces to knowledge bases—the case of the orakel system", In Journal of Data & Knowledge Engineering, vol. 65, Issue 2, May 2008, pp. 325-354.

Sabouret, et al., "Querying knowledge about actions in the semantic web", In Proceedings of Semantic Web workshop at KR, 2002, pp. 1-14.

Tablan, et al., "A natural language query interface to structured information", In Proceedings of the 5th European semantic web conference on the semantic web: research and applications, Jun. 1, 2008, pp. 1-15.

Yamada, et al., "Joint learning of the embedding of words and entities for named entity disambiguation", In Proceedings of the 20th SIGNLL Conference on Computational Natural Language Learning, Aug. 11, 2016, 10 pages.

Huang, et al., "Leveraging deep neural networks and knowledge graphs for entity disambiguation", In Journal of the Computing Research Repository, Apr. 2015, 10 pages.

Bordes, et al., "Learning structured embeddings of knowledge bases", In Proceedings of the Twenty-Fifth AAAI Conference on Artificial Intelligence, Aug. 7, 2011, 6 pages.

Wang, et al., "Knowledge graph and text jointly embedding", In Proceedings of the 2014 Conference on Empirical Methods in Natural Language Processing, Oct. 25, 2014, pp. 1591-1601.

Bian, et al., "Knowledge-Powered Deep Learning for Word Embedding", In Proceedings of Machine Learning and Knowledge Discovery in Databases—European Conference, Sep. 15, 2014, pp. 1-16.

Yang, et al., "Embedding entities and relations for learning and inference in knowledge bases", In Journal of the Computing Research Repository, Dec. 2014, pp. 1-13.

U.S. Appl. No. 15/256,142, Agarwal, et al., "Using structured smart digital memory to personalize digital agent and bot scenarios", filed Sep. 2, 2016.

"International Search Report and Written Opinion Issued in PCT Application No. PCT/US2018/019798", dated May 9, 2018, 12 pages.

\* cited by examiner

PERSONALIZED COMMUNICATIONS USING SEMANTIC MEMORY

TECHNICAL FIELD

Aspects and implementations of the present disclosure relate to data processing and, more specifically, but without limitation, to personalized communications using semantic memory.

BACKGROUND

Personal digital assistants are applications or services that retrieve information or execute tasks on behalf of a user. Users can communicate with such personal digital assistants using conversational interfaces such as messaging or chat interfaces.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, Systems and methods are disclosed for personalized communications using semantic memory. In one implementation, a first communication is received from a user and processed to identify a first content element within the communication. The first content element is associated with a second content element within a content repository. A second communication that includes the first content element is received from the user. Based on an association between the first content element and the second content element within the content repository, a third communication that includes the second content element is generated and provided to the user in response to the second communication.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to personalized communications using semantic memory.

It can be appreciated that personal digital assistants and related technologies can enable a user to obtain information, execute tasks, and perform other activities. Users can interact with or control such personal digital assistants via conversational interfaces such as messaging, chat, audio commands etc. Though such conversational interfaces provide a natural and intuitive medium for performing specific/individual tasks, such technologies do not leverage historical user inputs/interactions. As a result, as time goes on a user may repeat the same sequence of steps/communications with a personal digital assistant numerous times (e.g., for frequently performed tasks).

Accordingly, described herein in various implementations are technologies, including methods, machine readable mediums, and systems, that enable personalized communications using semantic memory. For example, the described technologies can parse communications, conversations, etc., associated with a user (e.g., conversations with a personal digital assistant) and extract entities or other content elements from such communications. The extracted elements can be stored in a content repository (e.g., a knowledge base or conversational graph) in accordance with an ontology that defines relationships between respective content elements. In doing so, the referenced content repository can reflect a knowledge base generated and maintained based on communications originating from or associated with the user. Subsequently, the content elements, relationships between them, etc., reflected in the knowledge base can be utilized to identify/recall and provide associated/related content to the user, as described in detail herein. Using the referenced historical knowledge base, a personal digital assistant (or other application) can identify preferences, selections, settings, and, in doing so, generate and provide enhanced/improved communications to the user, as described herein.

It can therefore be appreciated that the described technologies are directed to and address specific technical challenges and longstanding deficiencies in multiple technical areas, including but not limited to communication interfaces, semantic relationships, and personal digital assistants. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

Figure 1:
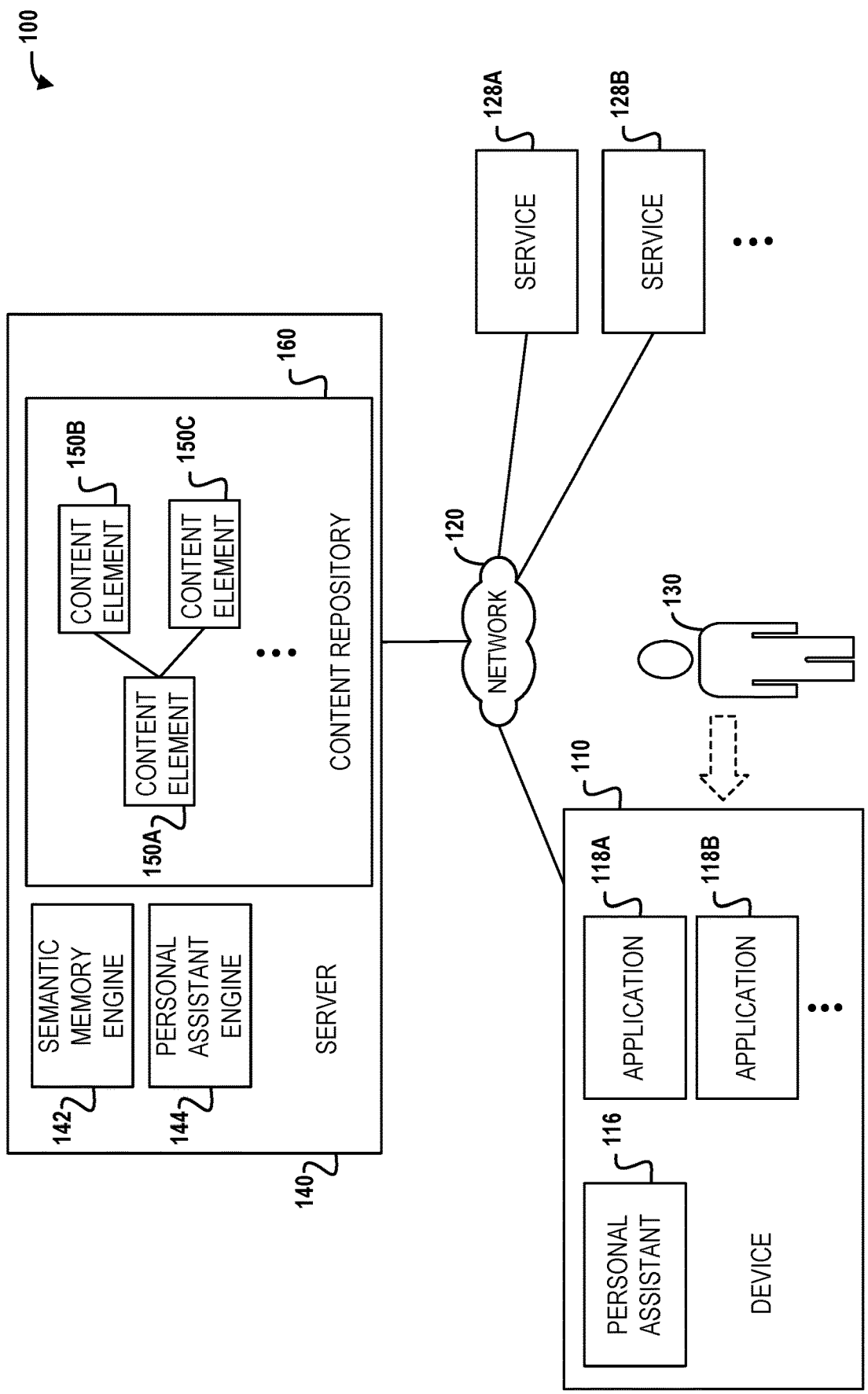
FIG. 1 illustrates an example system, in accordance with an example embodiment.

FIG. 1 illustrates an example system 100, in accordance with some implementations. As shown, the system 100 includes device 110 which can be a laptop computer, a desktop computer, a terminal, a mobile phone, a tablet computer, a smart watch, a personal digital assistant (PDA), a digital music player, a server, and the like. User 130 can be a human user who interacts with device 110. For example, user 130 can provide various inputs (e.g., via an input device/interface such as a keyboard, mouse, touchscreen, etc.) to device 110. Device 110 can also display, project, and/or otherwise provide content to user 130 (e.g., via output components such as a screen, speaker, etc.).

As shown in FIG. 1, device 110 can include personal assistant 116. Personal assistant 116 can be an application or module that configures/enables the device to interact with, provide content to, and/or otherwise perform operations on behalf of user 130. For example, personal assistant 116 can receive communications and/or request(s) from user 130 and present/provide responses to such request(s) (e.g., within a conversational or 'chat' interface). In certain implementations, personal assistant 116 can also identify content that can be relevant to user 130 (e.g., based on a location of the user or other such context) and present such content to the user. Personal assistant engine 116 can also enable user 130 to initiate and/or configure other application(s) (e.g., application 118A, as described below). For example, user 130 can provide a command/communication to personal assistant 116 (e.g., 'play jazz music'). In response to such command, personal assistant 116 can initiate an application (e.g., a media player application) that fulfills the request provided by the user. Additionally, while in certain implementations various aspects of personal assistant 116 can execute/operate on device 110, in other implementations personal assistant can operate in conjunction with personal assistant engine 144 which can execute on a remote device (e.g., server 140, as described below). In doing so, personal assistant 116 can, for example, request or receive information, communications, etc., from personal assistant engine 144, thereby enhancing the functionality of personal assistant 116.

Figure 5:
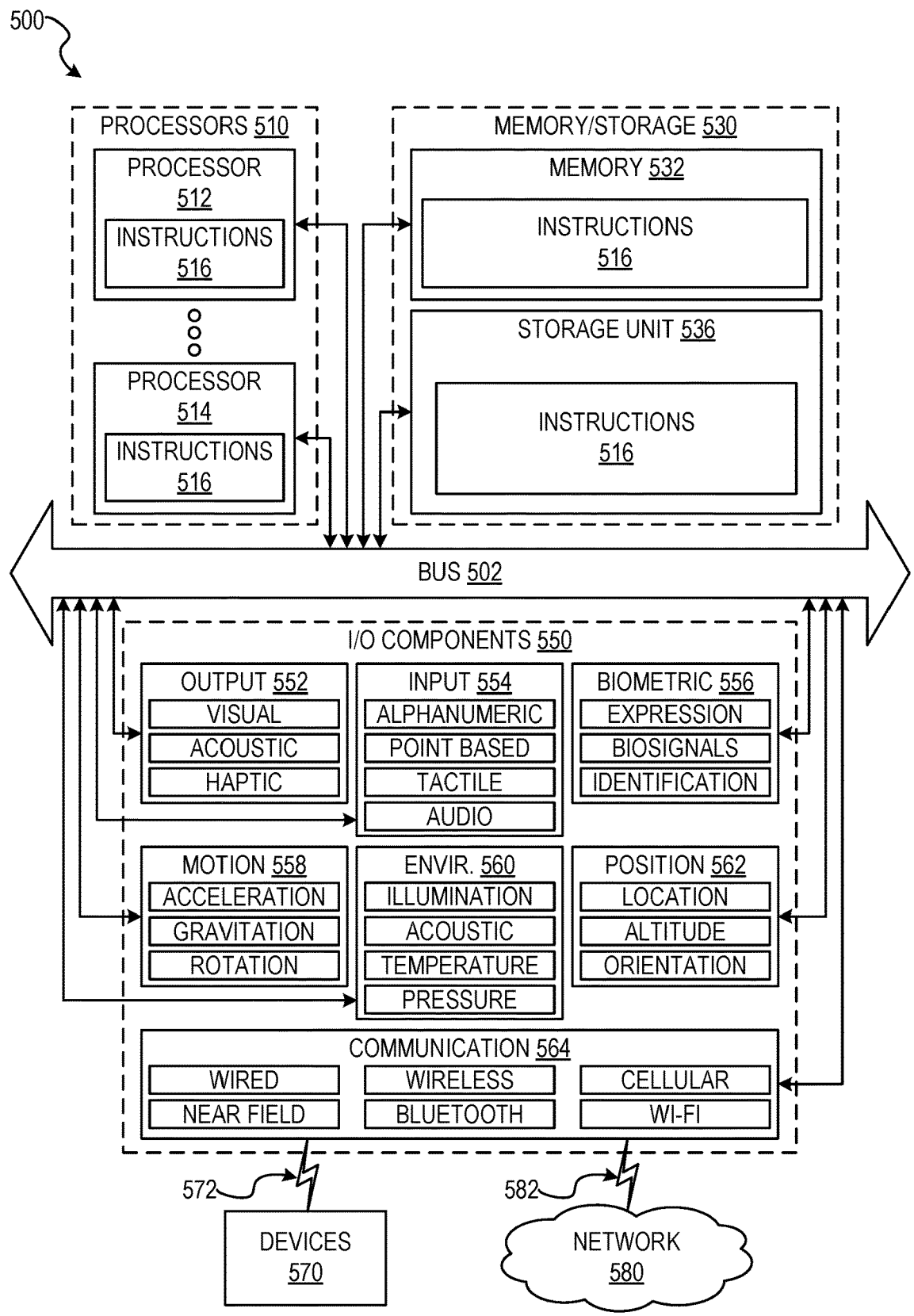
FIG. 5 is a block diagram illustrating components of a machine able to read instructions from a machine-readable medium and perform any of the methodologies discussed herein, according to an example embodiment.

As shown in FIG. 1, device 110 can also include various applications, programs, modules, etc., such as application 118A and application 118B. The referenced applications can be stored in memory of device 110 (e.g. memory 530 as depicted in FIG. 5 and described below). One or more processor(s) of device 110 (e.g., processors 510 as depicted in FIG. 5 and described below) can execute such application(s). In doing so, device 110 can be configured to perform various operations, present content to user 130, etc. Examples of such applications include but are not limited to: social media/messaging applications, mobile 'apps,' etc.

It should also be noted that while various components (e.g., personal assistant 116, application 118A, etc.) are depicted (e.g., in FIG. 1) as operating on a device 110, this is only for the sake of clarity. However, in other implementations the referenced components (e.g., application 118A) can also be implemented on other devices/machines. For example, in lieu of executing locally at device 110, application 118A (e.g., a ride-sharing application) can be implemented remotely (e.g., on a server device or within a cloud service or framework).

As also shown in FIG. 1, device 110 can connect to and/or otherwise communicate with server 140 via network 120. Network 120 can include one or more networks such as the Internet, a wide area network (WAN), a local area network (LAN), a virtual private network (VPN), an intranet, and the like. Server 140 can be, for example, a server computer, computing device, storage service (e.g., a 'cloud' service), etc., and can semantic memory engine 142, personal assistant engine 144, and content repository 160.

Semantic memory engine 142 can be an application or module that configures/enables server 140 to perform various operations such as are described herein. For example, semantic memory engine 142 can configure or enable server 140 to create, maintain, access, and/or query content repository 160. Content repository 160 can be, for example, a knowledge base or conversational graph within which various content elements (e.g., content element 150A, content element 150B, etc.,—collectively content elements 150—as shown in FIG. 1) can be stored. Such content elements can be, for example, various intents, entities, and/or actions, such as can be identified or extracted from communications, conversations, and/or other inputs received from, provided to, and/or otherwise associated with user 130. It should be understood that content repository 160 pertains to and/or is otherwise associated with user 130, such that the repository can content elements (e.g., entities, etc.) and related information with respect to which the user has previously communicated about, and reflect relationships and other associations between such elements.

In certain implementations, semantic memory engine 142 can utilize an ontology, model, and/or schema to define and/or represent various aspects, features, attributes, etc. of the content elements 150, as well as relationships between respective content elements. By way of illustration, semantic memory engine 142 can receive various communications from device 110 (e.g., a text communication, request, etc. that the user provides to personal assistant 116). Semantic memory engine 142 can process such communication(s) (e.g., using natural language processing and/or other such techniques) to parse the communication(s) and identify/extract content element(s) (e.g., entities, intents, actions, etc.) present within the received communication(s). The extracted content elements can then be stored within content repository 160 in accordance with the referenced ontology, model, and/or schema. In doing so, content repository 160 can reflect a knowledge base generated and maintained based on communications originating from or associated with the user. Subsequently, the content elements 150, relationships between them, etc., reflected in content repository 160 can be utilized (e.g., by personal assistant engine 144 and/or other applications/services) to identify/recall and provide associated/related content to the user, as described in detail herein. In doing so, content from conversations or communications of the user that occurred months or years prior can be leveraged to provide personalized/relevant content to the user and achieve additional efficiencies and advantages, as described herein.

In various implementations, the described technologies may utilize or leverage various services such as service 128A and service 128B (collectively services 128), as shown in FIG. 1. Such services can be, for example, third-party services that can enable the retrieval of content (e.g., business names, addresses, phone numbers, etc.) that may enhance or otherwise be relevant to certain operations described herein. In certain implementations, such received content/information can be stored within content repository 160 (thereby further enhancing the content stored therein). Additionally, in certain implementations such services can be services that the user may communicate/interact with, e.g., via application(s) 118. For example, service 128A can be a ride-sharing or taxi dispatch service that user 130 can communicate with via application 118A on device 110, and service 128B can be a restaurant/food delivery service that user 130 can communicate with via application 118B on device 110. As described herein, in certain implementations such services can access, receive content from, and/or otherwise utilize content repository 160 (e.g., via an application programming interface (API) in conjunction with semantic memory engine 142). In doing so, services 128 can receive and utilize content from the user's previous communications/conversations to enhance subsequent communications provided by the service(s), as described herein.

While many of the examples described herein are illustrated with respect to a single server 140, this is simply for the sake of clarity and brevity. However, it should be understood that the described technologies can also be implemented (in any number of configurations) across multiple servers and/or other computing devices/services.

Further aspects and features of device 110 and server 140 are described in more detail in conjunction with FIGS. 2-5, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
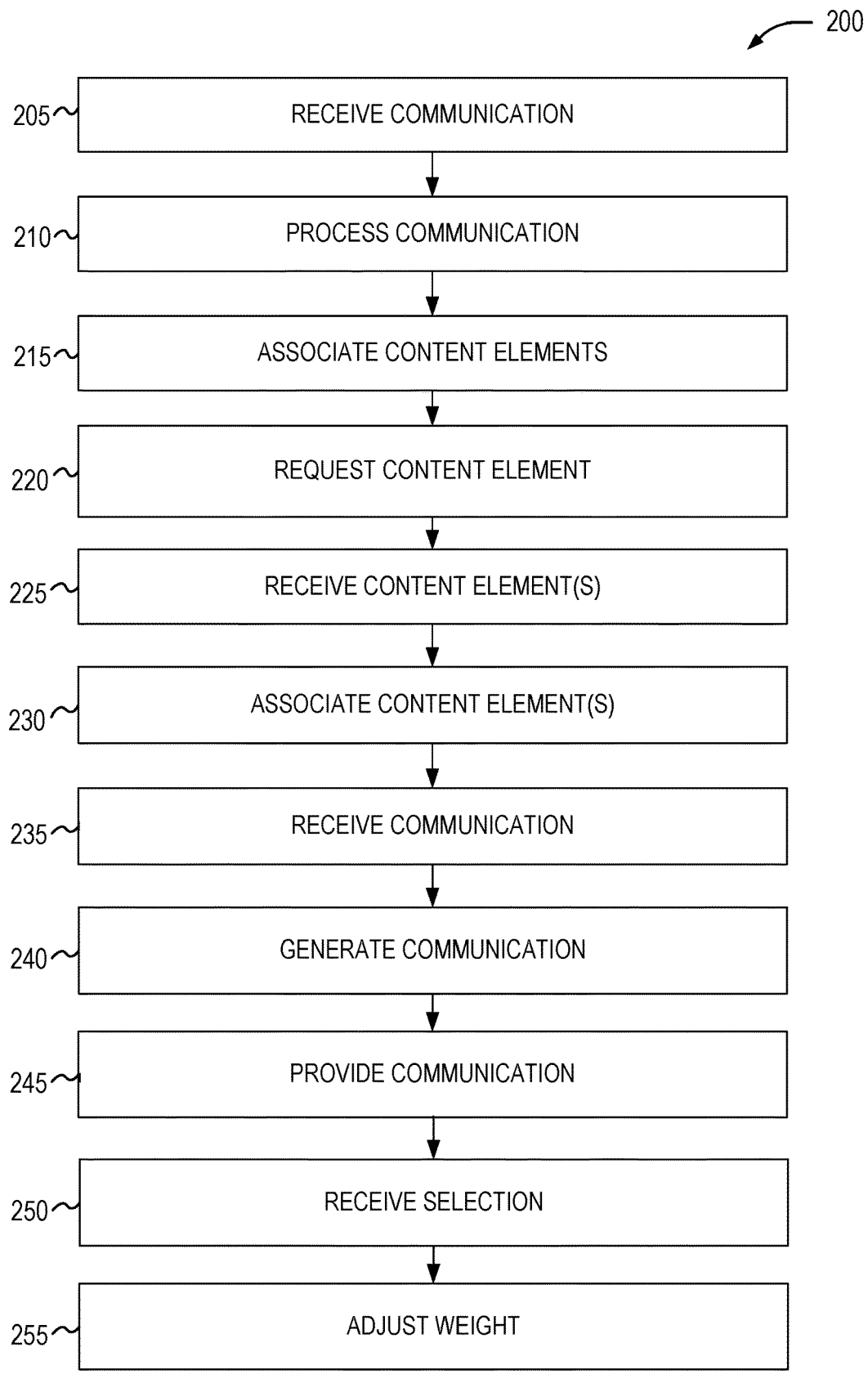
FIG. 2 is a flow chart illustrating a method, in accordance with an example embodiment, for personalized communications using semantic memory.

FIG. 2 is a flow chart illustrating a method 200, according to an example embodiment, for personalized communications using semantic memory. The method is performed by processing logic that can comprise hardware (circuitry, dedicated logic, etc.), software (such as is run on a computing device such as those described herein), or a combination of both. In one implementation, the method 200 is performed by one or more elements depicted and/or described in relation to FIG. 1 (including but not limited to server 140 and/or semantic memory engine 142), while in some other implementations, the one or more blocks of FIG. 2 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 205, a communication is received. In certain implementations, such a communication (e.g., a first communication) can originate/be received from a user (e.g., user 130). Such a communication can be, for example, a message/transmission (e.g., as provided within a messaging/chat interface or any other such communication framework). Additionally, in certain implementations the referenced communication can be provided via/received from an application or service (e.g., an external service with respect to which user 130 is messaging or otherwise communicating with). Moreover, in certain implementations the referenced communication can be received respect to a task (as described below). In certain implementations, various aspects of operation 205 (as well as the other operations described with respect to FIG. 2) are performed by server 140 and/or semantic memory engine 142 (e.g., as depicted in FIG. 1). In other implementations, such aspects can be performed by one or more other elements/components, such as those described herein.

Figure 3B:
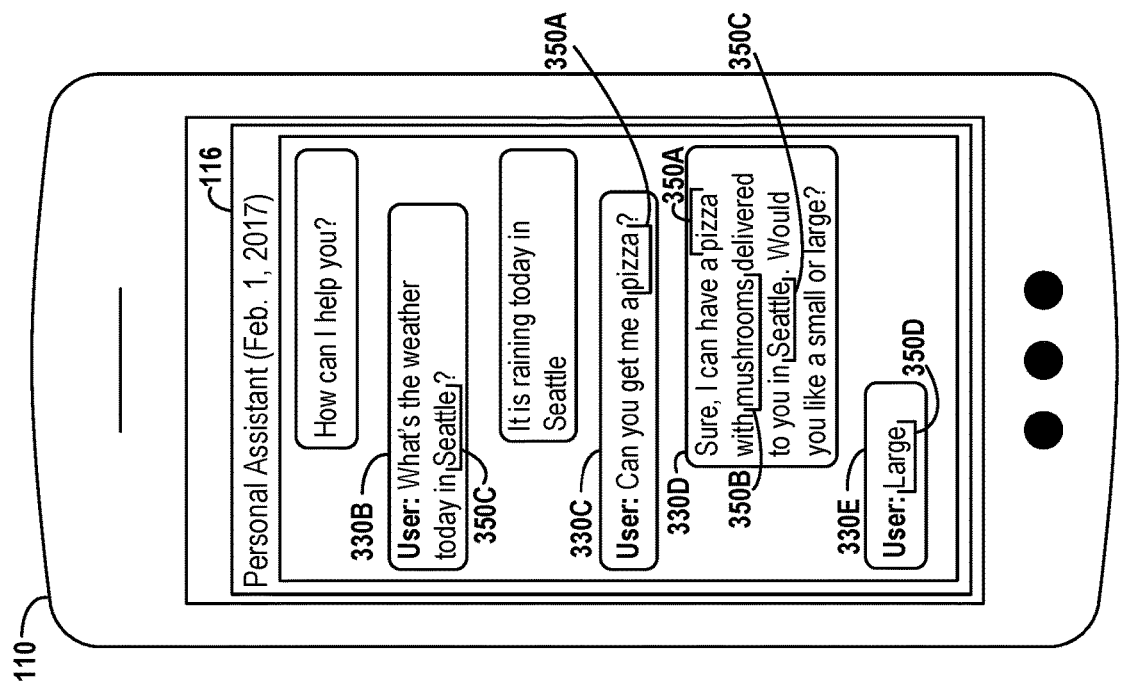
FIGS. 3A and 3B illustrate example scenarios described herein, according to an example embodiment.
Figure 3A:
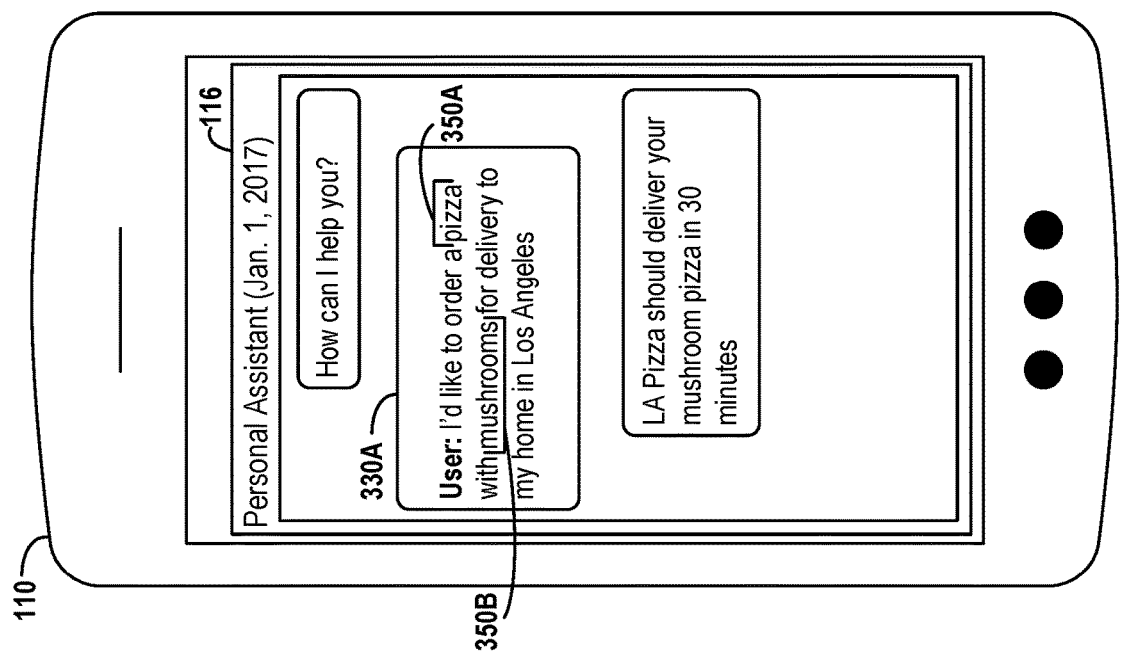

By way of illustration, FIG. 3A depicts an example scenario in which personal assistant 116 is executing on device 110. As shown in FIG. 3A, user 130 can provide/input communication/message 330A ("I'd like to order a pizza . . . "). Such communication 330A can be transmitted to/received by server 140 and/or semantic memory engine 142 (e.g., in conjunction with the operation of personal assistant 116 and/or personal assistant engine 144).

At operation 210, the communication (e.g., the communication received at operation 205) is processed. In doing so, a content element (or multiple content elements) can be identified within or otherwise extracted from the communication. In certain implementations, such a content element can include but it not limited to an intent, an entity, or an action. For example, with respect to FIG. 3A, communication/message 330A can be processed (e.g., by semantic memory engine 142) to identify or extract various content elements such as content element 350A (the entity "pizza").

At operation 215, one content element (e.g., the content element identified at operation 210) is associated with another content element, such as a content element stored within a content repository. In certain implementations, the associating of the referenced content elements can be performed based on/in conjunction with an ontology, schema, or model that defines relationships between elements within the content repository.

By way of illustration and with reference to FIG. 3A, semantic memory engine 142 can associate a content element identified within communication 330A with other content element(s) within a knowledge base/conversational graph associated with the user (content repository 160). For example, the entity "pizza" can be associated with the entity "mushrooms" within the knowledge base based on the presence of such entities in the same communication 330A.

At operation 220, an additional content element can be requested. In certain implementations, such additional content element can be requested in response to an identification of the content element (e.g., as identified at operation 210). In certain implementations, such a request for additional content element(s) can be a request for various supplemental information or metadata, such as may be used to complete various tasks, operations, etc., associated with a particular entity. For example, upon identifying a name of a restaurant, business, etc. (e.g., within a communication/request received from a user to " . . . make a reservation for dinner at Paul's Steakhouse . . . "), a request to obtain additional information/metadata (e.g., street address, phone number, website, etc.) can be generated/provided to an external service.

At operation 225, additional content element(s) (e.g., as requested at operation 220) can be received. As noted, in certain implementations such additional elements can correspond to supplemental content or metadata that provides additional information regarding an entity (e.g., address, phone number, etc.).

At operation 230, such additional content element(s) (e.g., as received at operation 225) can be associated with various other content elements within the content repository. For example, the supplemental information/metadata (e.g., the address, phone number, etc. of a restaurant) received from an external service can be stored within content repository 160 and associated therein with the content element that corresponds to the restaurant ("Paul's Steakhouse," in the example referenced above). In doing so, semantic memory engine 142 can recall and utilize such associated supplemental information/metadata with respect to subsequent communications, tasks, etc., that reference or otherwise pertain to the same (or related) entity, as described herein.

At operation 235, a second communication is received. In certain implementations, such a communication can be received from the user (e.g., the user from which the communication was received at operation 205). Such a communication can be, for example, a message/transmission (e.g., as provided within a messaging/chat interface or any other such communication framework). Additionally, such a communication can include the same content element (and/or a comparable, similar, or related content element) as identified (e.g., at operation 210) with respect to a previously received communication.

For example, FIG. 3B depicts an example scenario in which user 130 is communicating with personal assistant 116 one month after the communications depicted in FIG. 3A. As shown in FIG. 3B, a communication 330C can be received ("Can you get me a pizza?") which includes the same content element 350A (the entity "pizza") as was present in communication 330A (as shown in FIG. 3A).

Figure 4B:
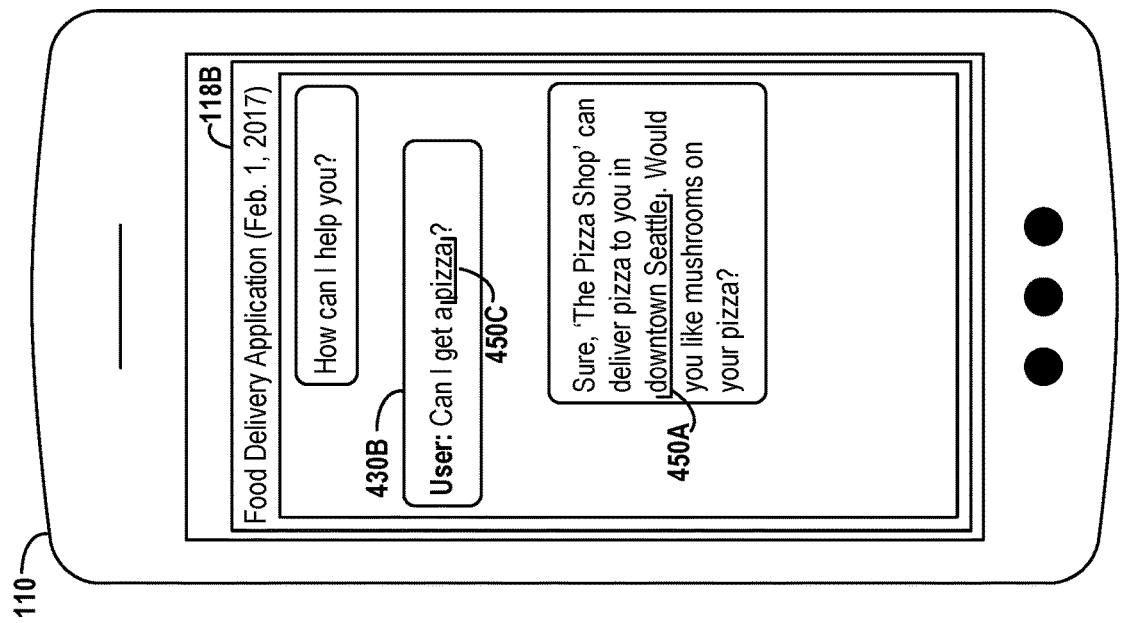
FIGS. 4A and 4B illustrate example scenarios described herein, according to an example embodiment.
Figure 4A:
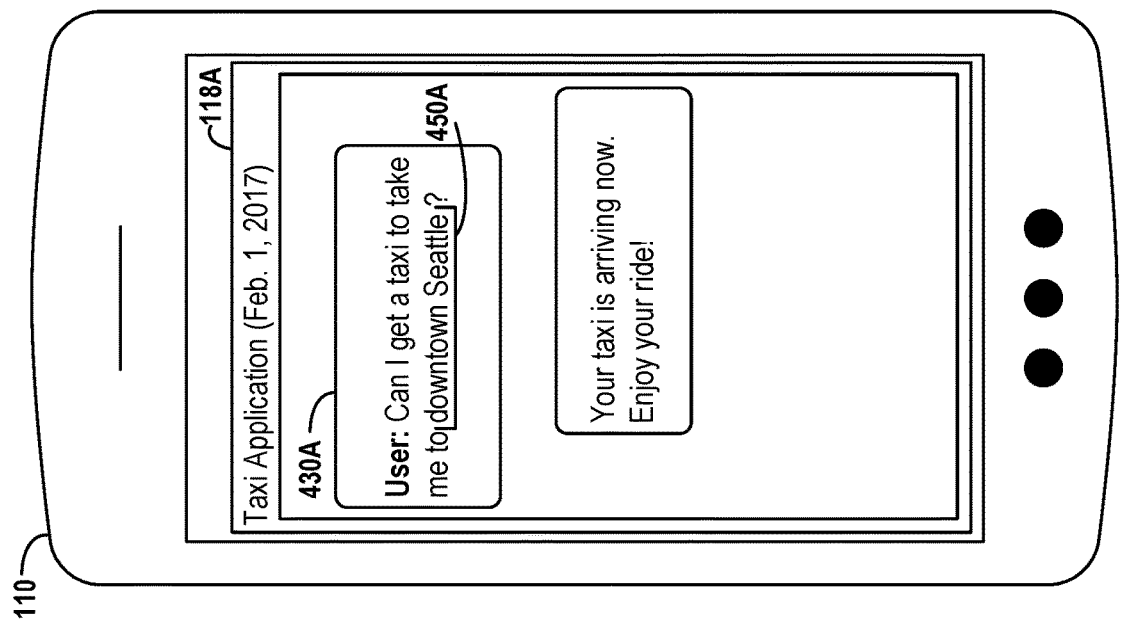

Additionally, in certain implementations the referenced communication can be provided via/received from another application or service (e.g., an external service with respect to which user is messaging or otherwise communicating with). For example, while the communication referenced above (e.g., at operation 205) can be received from one application, the present communication can be received from another application. By way of illustration, FIG. 4A depicts an example scenario in which user 130 is communicating with application 118A ('Taxi Application'). As shown in FIG. 4A, the user can provide communication 430A ("Can I get a taxi . . . ") within which content element 450A (the entity "downtown Seattle") can be identified (e.g., as described above). The user may then utilize or communicate with another application 118B ('Food Delivery Application'), as shown in FIG. 4B. As described in detail herein, semantic memory engine 142 can utilize a knowledge base/conversational graph associated with the user (content repository 160) to recall relevant content element(s) (e.g., 'downtown Seattle,' based on communication 430A provided by the user within application 118A) and to utilize such recalled content element(s) to generate/provide relevant responses/communications to the user (e.g., as shown in FIG. 4B, where application 118B generates a response to communication 430B based on the entity extracted from a communication within another application (as shown in FIG. 4A).

Moreover, in certain implementations the referenced communication can be received respect to another task. For example, FIG. 3A depicts a scenario in which user 130 initiates a first instance of a task pertaining to the ordering of pizza (e.g., in Los Angeles). FIG. 3B depicts a scenario (occurring one month after the scenario depicted in FIG. 3A) in which the user initiates another instance of the same or similar/related 'ordering pizza' task (this time, in Seattle). Accordingly, as shown in FIG. 3B, semantic memory engine 142 can utilize a knowledge base/conversational graph associated with the user (content repository 160) to recall relevant content element(s) (e.g., 'mushrooms,' as provided previously by the user in communication 330A in FIG. 3A). Semantic memory engine 142 (and/or a personal digital assistant or another application) can then utilize such recalled content element(s) to generate/provide relevant responses/communications to the user. For example, in response to a request from the user for 'pizza' (in communication 330C, as shown in FIG. 3B), communication 330D can be generated, and such communication can incorporate a recalled entity 350B ('mushrooms') based on its association with 'pizza' within the knowledge base.

At operation 240, a communication can be generated. In certain implementations, such a communication can be generated based on an association between a first content element (e.g., as identified at operation 210) and a second content element within a content repository. Additionally, in certain implementations such a generated communication can include or incorporate the second content element (e.g., a content element associated with or related to the first content element within content repository 160).

For example, as show in FIG. 3B, semantic memory engine 142 can utilize a knowledge base/conversational graph associated with the user (content repository 160) to recall relevant content element(s) (e.g., 'mushrooms,' as provided previously by the user in communication 330A in FIG. 3A). Such recalled content elements can be utilized to generate/provide relevant responses/communications to the user. For example, in response to a request from the user for 'pizza' (in communication 330C, as shown in FIG. 3B), communication 330D can be generated. As shown in FIG. 3B, such a communication 330D can incorporate entity 350B ('mushrooms') based on its association with 'pizza' within the knowledge base. In doing so, various preferences, options, etc., that a user has provided (e.g., in previous orders) can be pre-populated, thereby enabling the user to perform various tasks efficiently, without repeating the same or similar steps/selections each time. It should be noted, however, that the user can also be provided with the option to modify or override such selections (e.g., to order a pizza without mushrooms, with another topping, etc.).

It should also be noted that the described technologies can also be utilized to resume or complete a task that was previously initiated but not completed. For example, in a scenario in which a user begins a food delivery order but does not complete it, various selections, etc., the user has provided can be stored in the content repository in the manner described herein. Subsequently, when the user later initiates another food delivery order, the user can be provided with the option to resume the order that was previously initiated.

At operation 245, a communication (e.g., the communication generated at operation 240) can be provided to the user. In certain implementations, such a generated communication/response can be provided to the user in response to the second communication received from the user (e.g., as received at operation 235). For example, as shown in FIG. 3B, upon generating communication 330D, such communication can be provided to the user (e.g., via personal assistant engine 144 and/or personal assistant 116).

At operation 250, a selection is received. In certain implementations, such a selection can be received from the user (e.g., user 130) to which the communication/response was directed. In certain implementations, such a selection can be provided in response to the communication generated at operation 240 and/or provided at operation 245. Then, at operation 255, a weight associated with a content element can be adjusted. In certain implementations, such a weight can be adjusted based on a selection (or other such feedback) received from the user (e.g., at operation 250).

For example, as shown in FIG. 3B, certain communications (e.g., communication 330D) can prompt or request the user to make a selection (" . . . Would you like a small or large?"). Accordingly, upon receiving such a selection (e.g., in communication 330E in which the user selects 'large'), a weight associated with content element 350D (the entity 'Large') can be adjusted (e.g., by increasing its weight within the knowledge base with respect to an order of pizza). Additionally, by virtue of not being selected, a weight associated with the entity 'small' can also be adjusted (e.g., reduced), on account of the fact that the user did not select it. In doing so, in a subsequent request to recall related entities from the knowledge base (e.g., with respect to 'pizza'), the content element 'large' is likely to be prioritized/ranked higher or more relevant than 'small' (by virtue of the referenced adjustments to their respective weights).

Additionally, as noted above, in certain implementations the user can be provided with the option to cancel or override certain operations described herein. For example, though communication 330D incorporates entity 350B ('mushrooms') into the order for pizza, if the user subsequently overrides such a selection (or overrides such a selection multiple times), a weight associated with such an entity (e.g., with respect to its relevance to the entity 'pizza' within the knowledge base) can be adjusted (e.g., lowered). In doing so, the knowledge graph can further reflect that such an entity may not be as relevant as previously assumed.

It should also be noted that, being that the described content repository can store practically any amount of conversational data, certain content stored therein may become less relevant as time goes on. Accordingly, in certain implementations semantic memory engine 142 can be configured to identify content elements that are no longer relevant to the user (e.g., elements that have not been mentioned or referenced in communications from the user over a period of time). Weights associated with such elements can be adjusted (e.g., lowered) or such elements can be removed from the content repository. In doing so, semantic memory engine 142 can ensure that the content being recalled/provided to the user is likely to be relevant.

Additionally, as noted above, in certain implementations multiple content elements (e.g., entities) within a knowledge base may be relevant to recall with respect to a particular conversation. However, and it may not be advantageous or feasible to recall all such entities. Accordingly, in certain implementations semantic memory engine 142 can rank the related/associated entities in order to determine which entitie(s) are to be provided to the user.

It should be understood that the ranking of such entities can be achieved in any number of ways. For example, in certain implementations the degree to which there is semantic overlap between an entity referenced in a communication from a user and an entity within the content repository can indicate a higher degree of relevance (and thus increase the ranking of such an entity). In other implementations, overlap of a content element extracted from a communication from the user (e.g., "Find the store whose closing hours I asked for") with previous communications received from the user ("Closing hours for Costco in Lihue") can indicate a higher degree of relevance of the entity "Costco (Lihue, Hi.)" within the content repository.

Additionally, in certain implementations the overlap of content element extracted from a communication from the user (e.g., "Do you remember the name of the driving range I searched for"), with an attribute of a stored entity, can indicate a higher degree of relevance of the entity "Bob's Driving Range", based on the knowledge base further reflecting that this entity is a driving range.

Additionally, in certain implementations the overlap of content element extracted from a communication from the user ("Which movie theater did I visit in Tulsa") with contextual information associated with an entity, e.g., can indicate a higher degree of relevance of the entity "Cinemark Movies 8" in a scenario in which the knowledge base further reflects or includes information pertaining to the user's location when she queried or visited that entity.

Moreover, in certain implementations the overlap of content element extracted from a communication from the user (e.g., "Which restaurant did we visit last month in Bellevue") with temporal attributes can indicate a higher degree of relevance of the entity "El Gaucho" in a scenario in which the knowledge base further reflects or includes information pertaining to the temporal information of when the entity was visited or queried.

It should also be noted that while the technologies described herein are illustrated primarily with respect to personalized communications using semantic memory, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-4B are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 5 is a block diagram illustrating components of a machine 500, according to some example implementations, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein can be executed. The instructions 516 transform the general, non-programmed machine into a particular machine programmed to carry out the described and illustrated functions in the manner described. In alternative implementations, the machine 500 operates as a standalone device or can be coupled (e.g., networked) to other machines. In a networked deployment, the machine 500 can operate in the capacity of a server machine or a client machine in a server-client network environment, or as a peer machine in a peer-to-peer (or distributed) network environment. The machine 500 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 can include processors 510, memory/storage 530, and I/O components 550, which can be configured to communicate with each other such as via a bus 502. In an example implementation, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 512 and a processor 514 that can execute the instructions 516. The term "processor" is intended to include multi-core processors that can comprise two or more independent processors (sometimes referred to as "cores") that can execute instructions contemporaneously. Although FIG. 5 shows multiple processors 510, the machine 500 can include a single processor with a single core, a single processor with multiple cores (e.g., a multi-core processor), multiple processors with a single core, multiple processors with multiples cores, or any combination thereof.

The memory/storage 530 can include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 can also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions (e.g., instructions 516) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine (e.g., processors 510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 can include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 can include many other components that are not shown in FIG. 5. The I/O components 550 are grouped according to functionality merely for simplifying the following discussion and the grouping is in no way limiting. In various example implementations, the I/O components 550 can include output components 552 and input components 554. The output components 552 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 550 can include biometric components 556, motion components 558, environmental components 560, or position components 562, among a wide array of other components. For example, the biometric components 556 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 can include acceleration sensor components (e.g., accelerometer), gravitation sensor components, rotation sensor components (e.g., gyroscope), and so forth. The environmental components 560 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 562 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 550 can include communication components 564 operable to couple the machine 500 to a network 580 or devices 570 via a coupling 582 and a coupling 572, respectively. For example, the communication components 564 can include a network interface component or other suitable device to interface with the network 580. In further examples, the communication components 564 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 can be another machine or any of a wide variety of peripheral devices (e.g., a peripheral device coupled via a USB).

Moreover, the communication components 564 can detect identifiers or include components operable to detect identifiers. For example, the communication components 564 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 564, such as location via Internet Protocol (IP) geolocation, location via Wi-Fi® signal triangulation, location via detecting an NFC beacon signal that can indicate a particular location, and so forth.

In various example implementations, one or more portions of the network 580 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 can include a wireless or cellular network and the coupling 582 can be a Code Division Multiple Access (CDMA) connection, a Global System for Mobile communications (GSM) connection, or another type of cellular or wireless coupling. In this example, the coupling 582 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 can be transmitted or received over the network 580 using a transmission medium via a network interface device (e.g., a network interface component included in the communication components 564) and utilizing any one of a number of well-known transfer protocols (e.g., HTTP). Similarly, the instructions 516 can be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising: a processing device; and
a memory coupled to the processing device and storing instructions that, when executed by the processing device, cause the system to perform operations comprising:
receiving from a first application a first communication from a user;
semantically processing the first communication to identify a first content element and a second content element within the communication;
associating the first content element with the second content element within a content repository in accordance with an ontology model;
receiving a subsequent communication from the user including a third content element;
receiving from a second application a second communication from the user, the second communication comprising the first content element;
based on an association between the first content element and the second content element within the content repository and a context inferred from the third content element, generating a third communication, the third communication comprising the second content element and the third content element;
providing the third communication to the user in response to the second communication;
receiving a selection from the user in response to the third communication; and
based on the selection, adjusting, by either increasing or decreasing, a weight associated with the first content element within the content repository.

2. The system of claim 1, wherein the subsequent communication is from the second application.

3. The system of claim 1, wherein the first communication is related to a first task and wherein the second communication is related respect to a second task.

4. The system of claim 1, wherein the first communication is in response to a user input received by the first application.

5. The system of claim 1, wherein associating the first content element with the second content element comprises associating the first content element with the second content element based on an ontology that defines one or more relationships between elements within the content repository.

6. The system of claim 1, wherein the first content element comprises at least one of an intent, an entity, or an action.

7. The system of claim 1, wherein the operations further include:
- identifying a fourth content element that is no longer relevant to the user; and
- removing the fourth content element from the content repository.

8. A method comprising:
- receiving from a first application a first communication from a user;
- semantically processing the first communication to identify a first content element and a second content element within the communication;
- associating the first content element with the second content element within a content repository in accordance with an ontology model;
- receiving a subsequent communication from the user including a third content element;
- receiving from a second application a second communication from the user, the second communication comprising the first content element;
- based on an association between the first content element and the second content element within the content repository and a context inferred from the third content element, generating a third communication, the third communication comprising the second content element and the third content element;
- providing the third communication to the user in response to the second communication;
- receiving a selection from the user in response to the third communication; and
- based on the selection, adjusting, by either increasing or decreasing, a weight associated with the first content element within the content repository.

9. The method of claim 8, wherein the subsequent communication is from the second application.

10. The method of claim 8, wherein the first communication is related to a first task and wherein the second communication is related respect to a second task.

11. The method of claim 8, wherein the first communication is in response to a user input received by the first application.

12. The method of claim 8, wherein associating the first content element with the second content element comprises associating the first content element with the second content element based on an ontology that defines one or more relationships between elements within the content repository.

13. The method of claim 8, wherein the first content element comprises at least one of an intent, an entity, or an action.

14. The method of claim 8, further comprising:
- identifying a fourth content element that is no longer relevant to the user; and
- removing the fourth content element from the content repository.

15. A computer storage device having instructions stored thereon that, when executed by a processing device, cause the processing device to perform operations comprising:
- receiving from a first application a first communication from a user;
- semantically processing the first communication to identify a first content element and a second content element within the communication;
- associating the first content element with the second content element within a content repository in accordance with an ontology model;
- receiving a subsequent communication from the user including a third content element;
- receiving from a second application a second communication from the user, the second communication comprising the first content element;
- based on an association between the first content element and the second content element stored within the content repository and a context inferred from the third content element, generating a third communication, the third communication comprising the second content element and the third content element;
- providing the third communication to the user in response to the second communication;
- receiving a selection from the user in response to the third communication; and
- based on the selection, adjusting, by either increasing or decreasing, a weight associated with the first content element within the content repository.

16. The computer storage device of claim 15, wherein associating the first content element with the second content element comprises associating the first content element with the second content element based on an ontology that defines one or more relationships between elements within the content repository.

17. The computer storage device of claim 15, wherein the operations further include:
- identifying a fourth content element that is no longer relevant to the user; and
- removing the fourth content element from the content repository.

* * * * *